Sept. 10, 1963 G. W. DENTON ET AL 3,103,598
HIGH-SPEED CLAMP USING TWO BIASED HYPERCONDUCTIVE
NEGATIVE RESISTANCE DIODES
Filed July 26, 1960

WITNESSES
John E. Healy, Jr.
James F. Young

INVENTORS
Gene W. Denton and
Bernard L. Harris
BY V. W. Cleary
ATTORNEY

United States Patent Office 3,103,598
Patented Sept. 10, 1963

3,103,598

HIGH-SPEED CLAMP USING TWO BIASED HYPERCONDUCTIVE NEGATIVE RESISTANCE DIODES

Gene W. Denton and Bernard L. Harris, Baltimore, Md., assignors to Westinghouse Electric Corporation, East Pittsburgh, Pa., a corporation of Pennsylvania Filed July 26, 1960, Ser. No. 45,333
4 Claims. (Cl. 307—88.5)

This invention relates to a high-speed clamp, and more specifically to a high-speed clamp which is actuated by a rectangular waveform.

An object of the invention is to provide a clamp which will clamp a point of reference potential in a circuit to another point of reference potential.

Another object of the invention is the provision of a high-speed clamp which when actuated by the rectangular waveform will clamp a first point of reference potential to a second point of reference potential and when the rectangular waveform terminates will quickly and accurately release the first point of reference potential from being clamped to the second point of reference potential.

Still another object of the invention is to provide a clamp which will clamp to ground a first point of reference potential, in response to a rectangular waveform being applied to the clamp, and will release this clamp when the rectangular waveform is not applied to the clamp.

Briefly, in accordance with the above objects, there is provided a high-speed clamping device which utilizes two hyperconductive devices arranged in a series circuit. A first hyperconductive device is connected between a first reference potential and a second reference potential, and means are provided to bias the hyperconductive device such that it exhibits an extremely high impedance. A second hyperconductive device is likewise connected between the first and second points of reference potential and means are similarly provided to bias it so that it also exhibits an extremely high impedance. When an additional voltage of proper polarity is applied to the hyperconductive devices, it will place the devices into a hyperconductive region where the devices assume a low impedance and a substantial amount of current is thus afforded a path in the series circuit. When this action takes place the first point of reference potential assumes the same value as the other point of reference potential and may therefore be utilized to clamp an applied waveform to that point of reference potential.

Other and incidental objects of the invention will be apparent to those skilled in the art from the reading of the following specification and an inspection of the accompanying drawing, in which.

Figure 3:
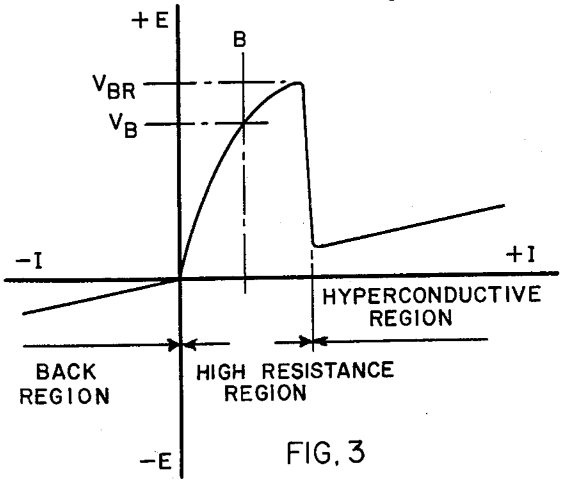
FIG. 3 illustrates a characteristic curve of the diodes employed in the embodiment of the invention illustrated in FIG. 2.

In the copending application Serial No. 642,743, filed February 27, 1957 by John Philips, entitled "Semiconductor Diode" is disclosed a hyperconductive negative resistance diode, the characteristic curve of which is shown in FIG. 3 of the drawing. When a forward bias voltage is applied across the diode, the diode will pass to the so-called high resistance state, with very little conduction, until the voltage applied acros the diode reaches a breakdown voltage illustrated as $V_{BR}$ in FIG.

3. When the breakdown voltage is reached, the drop across the diode reduces to nearly zero and the diode begins to conduct a usable amount of current at nearly a flat regulation. This region is shown in FIG. 3 as the hyperconductive region. The composition and operation of this diode is explained in more detail in the above copending application.

It has been discovered that the diode, which is the subject of the above copending application, is forward biased into the high resistance region, such as $V_B$ in FIG. 3, and a gate or rectangular waveform is applied to the diode to switch the diode into the hyperconductive region, if this waveform or pulse is quickly removed from the diode it will be the equivalent of applying a negative pulse to the diode so as to cause the diode to return to the non-conducting region or its bias state.

In the present invention this characteristic is utilized to provide an effective high-speed clamp. In the attendant claims it is intended the phrase "hyperconductive negative resistance device" mean devices having such characteristics.

Figure 1:
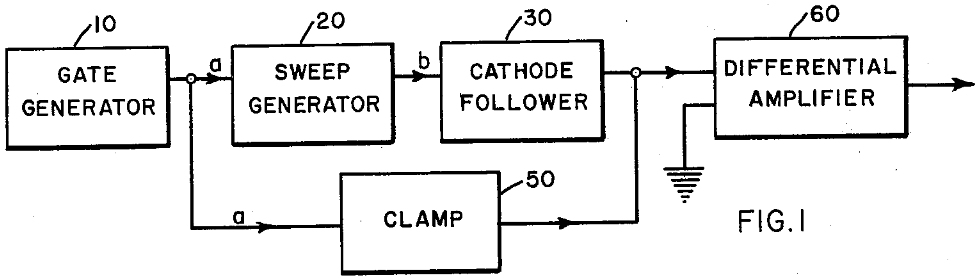
FIGURE 1 illustrates a circuit diagram in block form in which a clamp embodying the invention may be employed.
Figure 4:
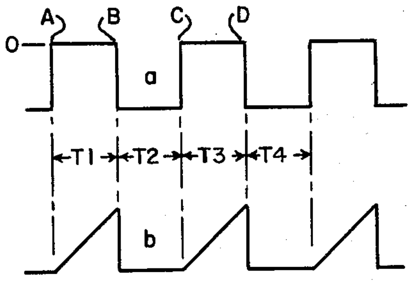
FIG. 4 illustrates waveforms occurring in the schematic diagram illustrated in FIG. 1.

FIG. 1 illustrates a schematic diagram in block form in which a clamp similar to the clamp of the present invention can be utilized. The letters illustrated between the block diagrams shown in FIG. 1 are letters indicating waveforms which appear in the corresponding curves shown in FIG. 4. In the circuit shown in FIG. 1 a gate generator 10 will produce a positive going rectangular shaped pulse shown in curve *a* of FIG. 4. These rectangular pulses pass through one channel to a sawtooth generator 20 which will produce a sawtooth-type wave as shown in curve *b* of FIG. 4. The time periods T1 and T3 of curve *a* of FIG. 4 illustrate time periods in which the sawtooth generator 20 will be gated by the rectangular pulses to provide a sawtooth-type output. The time periods T2 and T4 represent time periods which are defined by the rectangular pulses during which a zero output is desired. In the diagram shown in FIG. 1 the sawtooth output from the sweep generator 20 is fed to a cathode follower 30 shown in block form in FIG. 1, so as to provide at the cathode impedance thereof a sawtooth waveform similar to that shown in curve *b* of FIG. 4. This waveform, however, without a clamping means will probably have a D.C. level in the time periods T2 and T4.

The rectangular pulses shown in curve *a* of FIG. 4 are also fed to the clamp 50. By such an operation, the waveform being applied to the clamp 50 as shown in curve *a* of FIG. 4, has a negative going pulse during the time periods T2 and T4 and substantially zero output at time periods T1 and T3. In the embodiment of the present invention the clamp is responsive to the negative going rectangular waveforms shown in curve *a* to render the clamp 50 conductive and thereby clamp the output of the cathode follower 30 to ground during the time periods T2 and T4. A differential amplifier 60 is shown as receiving the output of the cathode follower 30.

Figure 2:
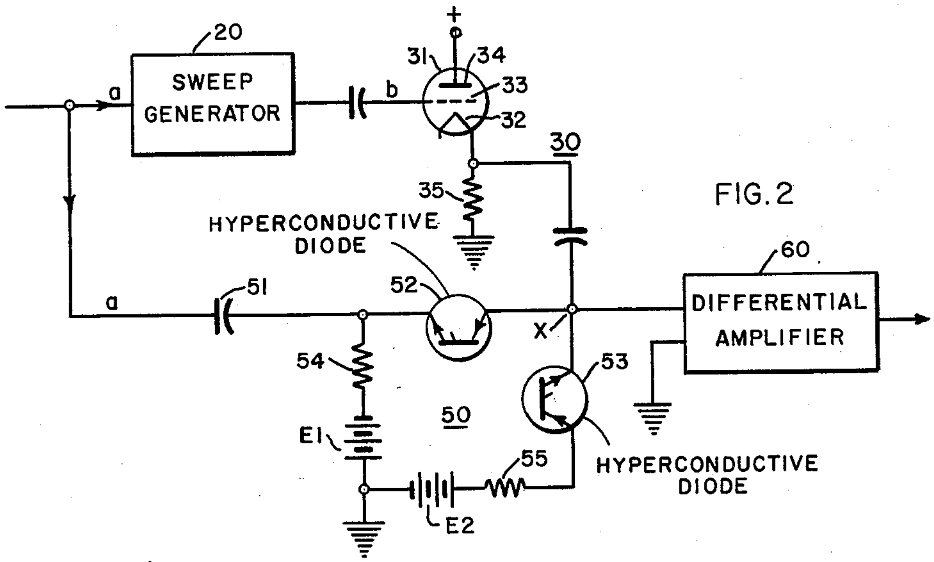
FIG. 2 illustrates a clamp embodying an invention.

The embodiment of the invention illustrated in FIG. 2 is a clamp which can be employed in the block diagram shown in FIG. 1 to provide a high-speed accurate clamp for ground for the cathode follower 30 or in any other circuit where a clamp is required. As shown in FIG. 2, the sawtooth generator 20 provides a sawtooth output through the cathode follower 30. The cathode follower 30 comprises a triode 31 having a cathode 32, a signal grid 33, and an anode 34. The cathode resistor 35 is the output of the cathode follower to provide an output to the differential amplifier 60. The sawtooth waveform shown in curve *b* FIG. 4 is applied to the signal grid 33 of the cathode follower 30. The waveform illustrated in curve *a* of FIG. 4 is, as explained above, a plurality of negative going rectangularly shaped pulses. An isolating capacitor 51 is provided at the input of the clamp 50. The embodiment of the invention illustrated in FIG. 2 comprises a clamp 50 which includes a series circuit having a first hyperconductive negative resistance diode 52, a second hyperconductive negative resistance diode 53, a first source of direct current potential E1 and a second source of direct current potential E2. Within this circuit current limiting resistors 54 and 55 are employed and are of equal value. The source of direct current supply E1 and E2 are also of equal value of potential. The diodes 52 and 53 are poled in the same direction in the series circuit of the clamp 50, and between these diodes is a point of reference potential X which is the output of the cathode follower 30. As can be understood if the point of reference potential X is grounded, the output of the cathode follower 30 will also be grounded.

The sources of direct current potential E1 and E2 are of such a polarity so as to bias the negative resistance hyperconductive diodes 52 and 53 into the high resistance region in a bias condition indicated by $V_B$ as shown in FIG. 3. Connected between the potential sources E1 and E2 is ground potential; that is, a point between the two equal voltage sources E1 and E2 is connected to ground. Hence, with just bias of the voltage sources E1 and E2 on diodes 52 and 53, there will be virtually no conduction in this series circuit when no input is applied to the clamp and the diodes 52 and 53 will be maintained in a bias condition $V_B$ as shown in FIG. 3, in the high resistance region.

Viewing FIG. 4 it will be seen that during the time periods T1 and T3, etc., there will be no input applied to the clamp 50; hence, an extremely small amount of current will flow through the series circuit described above and the potential of point X will not be affected by the clamp. During periods T1 and T3 the sawtooth waveforms occurring in time periods T1 and T3 will be transmitted from the cathode resistor 35 to the differential amplifier 60 to provide an output thereof of a sawtooth-type waveform. At the end of periods T1 and T3, however, the sawtooth waveform will reach its steep trailing edge and at the same time a sharp negative going rectangular pulse will be applied to the clamp 50. When these negative going pulses are applied to the clamp 50, the forward bias on the diodes 52 and 53 will be increased sufficiently beyond the breakdown voltage $V_{BR}$ shown in FIG. 3, to break down the diodes 52 and 53 and render the diodes hyperconductive as shown in FIG. 3. While the negative going pulses occurring in periods T2 and T4 remain applied to the clamp 50, the hyperconduction of the diodes 52 and 53 will effect a current through the series circuit. Since the voltage sources E1 and E2 are of equal value as are the resistors 54 and 55, point X will have the same potential as ground potential which is connected between the voltage sources E1 and E2. Consequently, while the negative going pulses are being applied to the clamp 50, during time periods T2 and T4, the output of the cathode follower 30 will be effectively and accurately clamped to ground since the voltage drops over 52 and 53 will be equal. As stated above, during the application of these negative going pulses to the clamp 50, the hyperconductive negative resistance diodes 52 and 53 will remain in the hyperconductive region.

When the trailing edge of the negative going rectangular pulses occurring in time periods T2 and T4 occurs, it will quickly remove the additional potential being applied thereto and due to this quick removal of this potential and the characteristic of the diode as explained above, the diodes will return to the non-conducting region and more specifically to its bias state $V_B$ shown in FIG. 3. Hence, the quick removal of the bias effected by the negative going rectangular pulses, is equivalent to applying a negative pulse to the diodes due to this characteristic of the diodes.

It will be understood that the time periods T1 through T4 are shown for purposes of illustration, and the biasing and switching of the diodes from conduction to nonconduction will continue to occur so long as the negative going pulses are applied to the clamp 50 as shown in curve *a* of FIG. 4 with the trailing steep edge of the rectangular pulses resulting in switching the hyperconductive negative resistance diodes from the hyperconductive region to the non-conducting region so as to give the effect of applying a negative pulse to the diodes.

Although the invention has been described above, it will be understood that the invention is not limited to the specific embodiment illustrated since the principle of the invention can be applied in various ways.

We claim as our invention:

1. A high-speed clamp for selectively clamping a first point of reference potential to another point of reference potential comprising a series circuit including a first negative resistance hyperconductive device connected between said first point of reference potential and said other point of reference potential, a second negative resistance hyperconductive device connected between said first point of reference potential and said other point of reference potential, said hyperconductive devices being of the same negative resistance polarity in said circuit, means for applying a bias to said first and said second hyperconductive devices, and means for applying a potential to said circuit to further bias said first and said second hyperconductive devices to thereby render said diodes hyperconductive.

2. A high-speed clamp for selectively clamping a first point of reference potential to another point of reference potential comprising a series circuit including a first source of direct current supply and a first negative resistance hyperconductive device connected between said first point of reference potential and said other point of reference potential, a second negative resistance hyperconductive device and a second source of potential connected between said first point of reference potential and said other point of reference potential, said first and said second sources of potential being poled to forward bias said first and said second hyperconductive devices, and means for applying a rectangularly shaped waveform to said circuit to render said hyperconductive devices hyperconductive.

3. A high-speed clamp for selectively clamping a first point of reference potential to another point of reference potential comprising a series circuit including a first and a second source of direct current potential, a first and a second hyperconductive negative resistance device, said first device and said first source being connected between said other point of reference potential and said first point of reference potential, said second source and said second device being connected between said first point of reference potential and said other point of reference potential, said devices being connected in said circuit with the same negative resistance polarity and said sources being connected in said circuit with the same polarity to bias said devices, and means for applying a rectangularly shaped waveform to said circuit to render said hyperconductive devices hyperconductive, and subsequently place them in a high impedance state.

4. A high-speed clamp for selectively clamping a point of reference potential to ground comprising a first source of direct current potential and a first hyperconductive negative resistance device, a second source of direct current potential and a second hyperconductive negative resistance device, said first source and said first device being connected between said point of reference potential and ground for conducting forward current through said first device between ground and said point of reference potential in a first direction, said second device and said second source being connected between said point of reference potential and ground for conducting forward current through said devices in an opposite direction, said first and said second sources being poled to forward bias said first and said second devices, and means for applying a rectangularly shaped pulse across said first source to render said first and said second devices hyperconductive and subsequently place them in a high impedance state upon removal of said rectangular pulse.

References Cited in the file of this patent

UNITED STATES PATENTS 2,614,140 Kreer ---------------- Oct. 14, 1952

2,944,164 Odell ---------------- July 5, 1960

2,951,124 Hussey ---------------- Aug. 30, 1960

OTHER REFERENCES

Reprint from January 1960 issue of Electrical Manufacturing, "PNPN Four-Layer Diodes in Switching Functions," by Carlson & McMahon (8 pp.).